Sept. 19, 1961 F. M. TRAPNELL, JR., ET AL 3,001,147

WIDEBAND AMPLIFIER APPARATUS

Filed Aug. 14, 1959 2 Sheets-Sheet 1

INVENTORS
FREDERICK M. TRAPNELL JR.
RAYMOND E. BONNER

BY Harry T. Berriman

AGENT

United States Patent Office 3,001,147
Patented Sept. 19, 1961

3,001,147

WIDEBAND AMPLIFIER APPARATUS

Frederick M. Trapnell, Jr., and Raymond E. Bonner, Poughkeepsie, N.Y., assignors to International Business Machines Corporation, New York, N.Y., a corporation of New York Filed Aug. 14, 1959, Ser. No. 833,751
1 Claim. (Cl. 330—84)

This invention relates to signal amplifying systems and more particularly to such systems wherein substantially constant amplification is required over a wide range of frequency values.

Normally wideband amplification is obtained by combining a first amplifier having a bandpass that is relatively flat at higher freqencies, with a second amplifier having a bandpass that is relatively flat at lower frequencies, in such a way as to produce a composite amplifier having a passband characteristic which is substantially flat over the entire frequency range of both amplifiers. Most often this composite wideband amplification is accomplished by feeding the outputs of both amplifiers into a so-called crossover network. The crossover network is a frequency selective network which divides the total frequency bandwidth desired into individual sections each section being supplied by a selected portion of the frequency spectrum of a related one of the amplifiers. These networks usually produce degradation of the passband flatness unless great care is taken in their design.

In the present invention wideband amplification is obtained by combining the output of a pair of amplifiers, however, instead of combining the outputs in a crossover network, a simple summing device is used. The proper combination of the outputs of the two amplifiers to give the desired wide and substantially flat bandpass characteristic is obtained by a negative feedback arrangement from the summed output around the particular amplifier providing the lower frequency portion of the desired total composite bandwidth. By this arrangement the frequency selective characteristics of the conventional crossover network are obtained with, however, no degradation of passband flatness beyond what the two amplifiers themselves produce.

It is accordingly an object of the invention to provide an improved wideband amplifier apparatus.

It is another object to provide an improved wideband amplifier apparatus wherein the bandpass is substantially flat between certain predetermined limits.

It is a still further object to provide an improved wideband amplifier apparatus by combining the outputs of a pair of amplifiers and which utilizes feedback to give a frequency crossover function with no degradation of the composite passband of the two amplifiers beyond what the two amplifiers themselves produce.

It is a still further object of the invention to provide an improved wideband amplifier apparatus wherein a pair of amplifiers have selected portions of their output bandwidths combined by a feedback action around one of the amplifiers to accordingly obtain the equivalent effect of a crossover network function without the use of such a network.

It is another object to provide an improved wideband amplifier apparatus utilizing a low frequency amplifier and a high frequency amplifier so arranged with a feedback arrangement around one amplifier that there is obtained an overall frequency response that is within 1% of being flat from zero frequency to the limit of the high frequency amplifier used.

It is a still further object of the invention to provide an improved amplifier apparatus wherein the outputs of a pair of amplifiers having bandpass characteristics which are flat at only a portion of the frequency spectrum thereof are combined in such a manner as to give a composite passband characteristic which is substantially flat over the the entire frequency range of both amplifiers and without the utilization of the usual crossover network.

The foregoing and other objects, features and advantages of the invention will be apparent from the following more particular description of a preferred embodiment of the invention as illustrated in the accompanying drawings.

Figure 1:
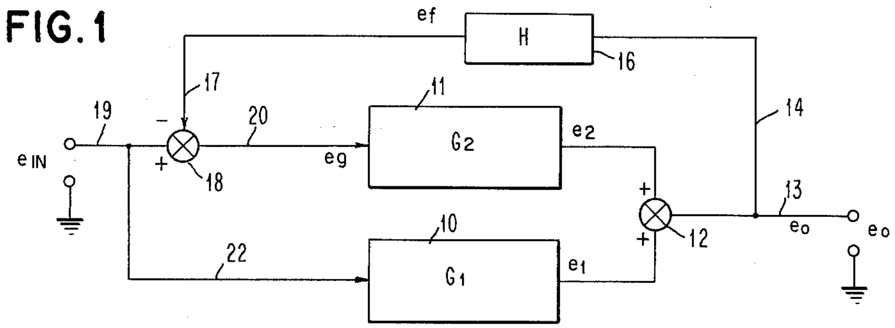
FIG. 1 is a simplified block circuit diagram of the improved wideband amplifier apparatus.
Figure 3:
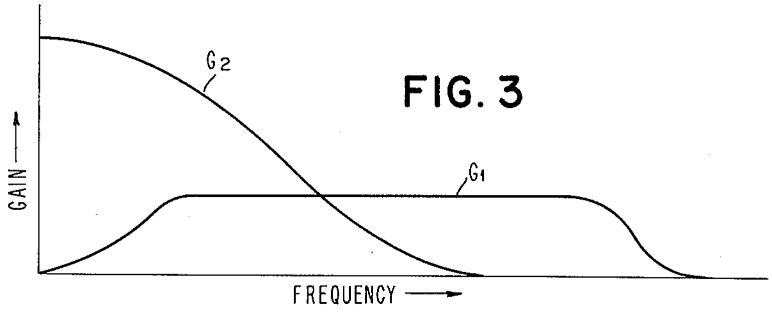
FIG. 3 is a graph of the frequency versus gain characteristic of the two individual amplifiers forming part of the improved amplifier apparatus.

Referring now to FIG. 1, the improved amplifier apparatus is shown in generalized block diagram form and comprises an amplifier 10 which is defined as a high bandpass amplifier and which may have a frequency versus gain characteristic curve as referenced G1 in FIG. 3. It will be noted from the curve G1 that the gain of amplifier 10 is zero at zero frequency and increases steadily with increasing frequency up to point whereafter, the gain is substantially constant or flat for an appreciable mid-frequency span, with the gain then dropping off rapidly towards zero at the high frequency end.

There is also provided another amplifier 11 which is defined as a low bandpass amplifier and which may have a frequency versus gain characteristic curve as referenced G2 in FIG. 3. It will be noted from the curve G2 that the gain of the amplifier 11 is high at the low frequency end and decreases steadily with increasing frequency. It will also be noted that the characteristic curves G1 and G2 intersect at a point in the middle frequency range of amplifier 10 and this intersection point is usually defined as the frequency "crossover" point. The terms high bandpass for the amplifier 10 and low bandpass for amplifier 11 are of course, descriptive of the fact that at the low frequency end of the frequency spectrum represented in FIG. 3, amplifier 11 is effective, while at the upper frequency end of the spectrum represented, amplifier 10 is effective.

Figure 4:
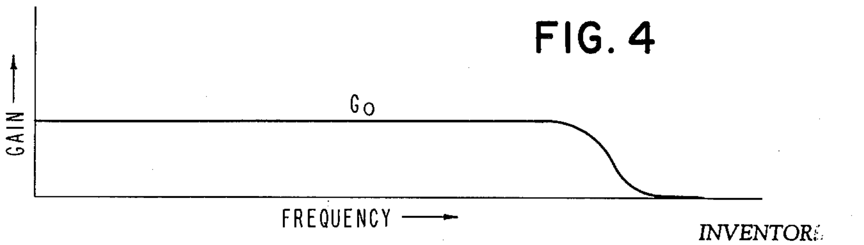
FIG. 4 is a graph of the frequency versus gain characteristic of the improved apparatus of FIGS. 1 and 2.

An amplifier apparatus having a frequency versus gain characteristic that is substantially flat from zero frequency to the upper frequency limits as represented by the curve of FIG. 4 may be obtained by combining the amplifiers 10 and 11 as indicated in FIG. 1. The outputs of the two amplifiers are summed positively in an output junction designated 12, the output from junction 12 being available on a conductor 13. A signal feedback is applied from the conductor 13, through a conductor 14, a feedback function element designated 16, and a conductor 17 to one input of a signal summing junction generally designated 18. A second input of the junction 18 has applied thereto through a conductor 19, a driving input signal from some suitable external source. The feedback signal applied through conductor 17 to junction 18 is subtractive or in a reverse sense relative to the external input signal applied through conductor 19 to the junction. The resultant difference signal generated on the output of junction 18 is applied through a conductor 20 and serves as the driving signal source for the low pass amplifier 11. The signal applied from the external source through conductor 19 to junction 18 is also applied through a conductor 22 to the input of the high pass amplifier 10 to drive it. It is thus evident that the feedback signal (conductor 14) from the output is applied around the low pass amplifier 11 only, there being no feedback around amplifier 10.

In the circuit of FIG. 1, the following is defined:

$e_0$=the output voltage (signal) on conductor 13
$e_{in}$=the input voltage on conductor 19
$e_g$=the error or difference voltage from summing junction 18 and applied through conductor 20 to drive the input of amplifier 12
$e_f$=the feedback voltage on conductor 17
$e_1$=the voltage output of amplifier 10 and applied to one input of junction 12
$e_2$=the voltage output of amplifier 11 and applied to the other input of junction 12
$G_1$=the gain of amplifier 10
$G_2$=the gain of amplifier 11
$H$=the signal feedback function of element 16
$G_0$=the overall gain of the entire system With the above definitions the following relations may be developed.

$$G_0=\frac{e_0}{e_{in}} \tag{1}$$

$$e_0=e_2+e_1 \tag{2}$$

$$e_2=G_2e_g \tag{3}$$

examining the voltages about junction 18 we can state that $$e_g=e_{in}-e_f \tag{4}$$

defining $e_f$ in terms of $e_0$ we obtain $$e_f=He_0 \tag{5}$$

substituting from Equation 5 into Equation 4, we obtain $$e_g=e_{in}-He_0 \tag{6}$$

Therefore restating Equation 3 by substituting for $e_g$ as defined in Equation 6, we obtain $$e_2=G_2(e_{in}-He_0) \tag{7}$$

It may also be stated that $$e_1=G_1e_{in} \tag{8}$$

Therefore restating Equation 2 by inserting the equivalents for $e_1$ and $e_2$ as set forth in Equations 8 and 7 respectively we have $$e_0=G_2(e_{in}-He_0)+G_1e_{in} \tag{9}$$

expanding Equation 9 to achieve $e_0$ in a more usable form $$e_0=G_2e_{in}-G_2He_0+G_1e_{in}$$

transposing $$e_0+G_2He_0=G_2e_{in}+e_{in}G_1$$

factoring $$e_0(1+G_2H)=e_{in}(G_1+G_2)$$

Solving again for $e_0$ $$e_0=\frac{e_{in}(G_1+G_2)}{1+G_2H} \tag{10}$$

Now solving Equation 1 for $G_0$ using $e_0$ in the form as developed in Equation 10 we have $$G_0=\frac{e_0}{e_{in}}=\frac{(G_1+G_2)}{1+G_2H}$$

or rewriting in another form we have by factoring out $1/H$ which we may define as the signal feedback constant we have $$G_0=\frac{1}{H}\left\{\frac{G_1+G_2}{\frac{1}{H}+G_2}\right\} \tag{11}$$

It will be noted that Equation 11 developed above is a general expansion defining the overall gain of the amplifier system.

Now if we set the feedback constant $1/H$ equal to $\overline{G_1}$, where $\overline{G_1}$ equals nominal gain $G_1$ (see FIG. 1) at intermediate and high frequencies of the total frequency spectrum of amplifier (10), the following conditions evolve.

Referring to FIG. 1, it will be noted that at low frequencies $G_1$ goes toward zero so that $G_2$ is very much greater than $G_1$ and therefore at low frequencies $G_1+G_2$ approximates $G_2$ as does $\overline{G_1}+G_2$ and $G_0$ at low frequencies accordingly becomes by substituting in Equation 11

$$G_0 \text{ (at low frequencies)}=\frac{1}{H}\left\{\frac{G_1+G_2}{\frac{1}{H}+G_2}\right\}=\overline{G_1}\left\{\frac{G_2}{\overline{G_1}+G_2}\right\}=\overline{G} \tag{12}$$

Referring again to FIG. 1, it will be noted that at high frequencies $G_2$ goes to zero or is much less than $G_1$ and therefore for the high frequencies $G_1+G_2$ approximates $G_1$ and $G_0$ at high frequencies accordingly becomes substituting in Equation 11 and remembering that $\overline{G_1}=G_1$ at high frequencies $$G_0 \text{ (at high frequencies)}=\frac{1}{H}\left\{\frac{G_1+G_2}{\frac{1}{H}+G_2}\right\}=\overline{G_1}\left\{\frac{G_1}{\overline{G_1}+G_2}\right\}=\overline{G_1}\left\{\frac{\overline{G_1}}{\overline{G_1}}\right\}=\overline{G_1} \tag{13}$$

At intermediate frequencies in order that the response be flat we require that (see FIGS. 3 and 4) $G_2$ be much greater than $G_1$ until $G_1=\overline{G_1}$. If this is so, then $$G_0 \text{ (at intermediate frequencies)}=\frac{1}{H}\left\{\frac{G_1+G_2}{\frac{1}{H}+G_2}\right\}=\overline{G_1}\left\{\frac{\overline{G_1}+G_2}{\overline{G_1}+G_2}\right\}=\overline{G_1} \tag{14}$$

From examination of the above Equations 12, 13, and 14 it is thus evident that if $G_2$ can be maintained much greater than $G_1$ (so that the low frequency derivation of Equation 12 is maintained) up to the frequencies where $G_1$ equals $\overline{G_1}$, then $G_0$ or the overall gain for the system equals $\overline{G_1}$ for all frequencies out to where $G_1$ goes down on the high frequency end. This required relationship between the individual amplifiers of the composite apparatus (FIG. 1) may be obtained as long as one of the amplifiers may be operated as a high gain feedback amplifier. Thus in FIG. 1, the low pass amplifier 11 fulfills these requirements as indicated in FIG. 3. The high gain feedback amplifier need not pass D.C. signals nor does it have to be the low pass amplifier that operates this way.

Figure 7:
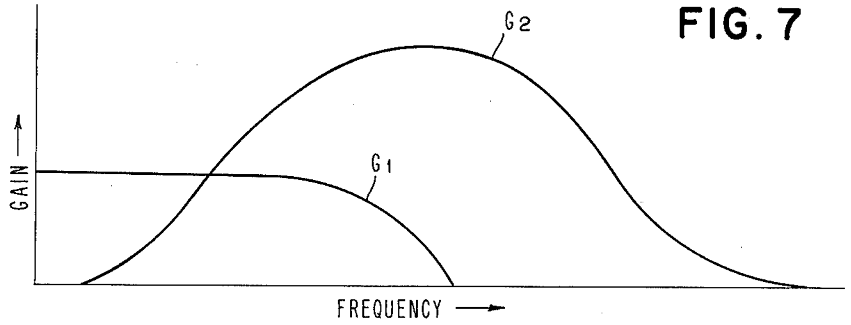
FIG. 7 is a graph of the frequency versus gain characteristic of two other representative individual amplifiers having different characteristics than the amplifiers whose characteristics are shown in FIG. 3.
Figure 8:
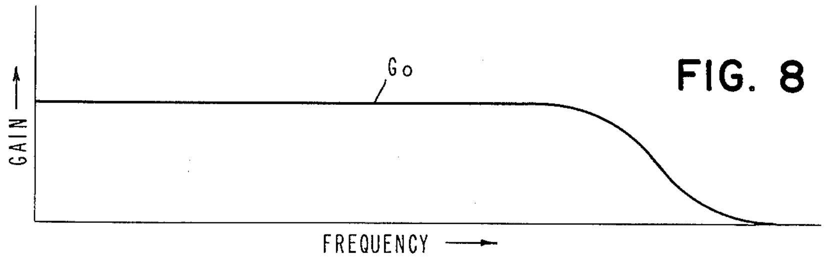
FIG. 8 is a graph of the frequency versus gain characteristic of the overall system of FIG. 1 if the amplifiers having curves as represented in FIG. 7 are inserted therein in place of the amplifiers having curves as in FIG. 3.

For example, in FIG. 7 there is shown frequencies versus gain characteristics of two amplifiers, one amplifier having a relative flat gain $G_1$ from zero frequency to an intermediate frequency where it drops off, while the other amplifier is a high gain amplifier having a non-linear characteristic curve which drops off at both the high and low ends. With these two amplifiers arranged in the circuit and with the high gain amplifier only having the feedback arrangement thereabout, the system frequency versus gain characteristic again becomes flat over an extended range as indicated in FIG. 8, in the same manner as indicated in FIG. 4 for the amplifiers whose gain characteristics are shown in FIG. 1.

Figure 2:
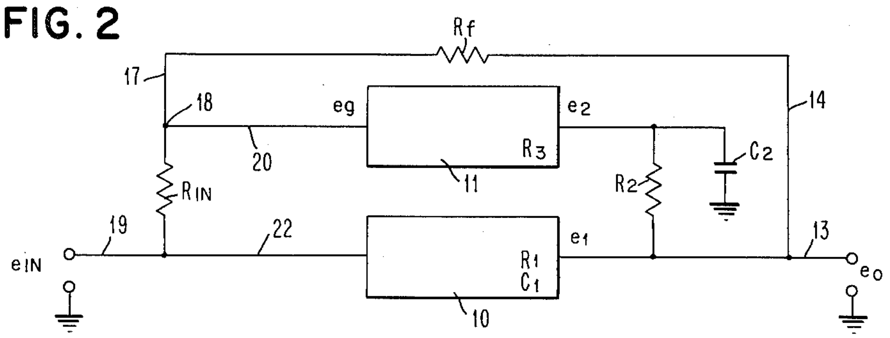
FIG. 2 is the circuit diagram of FIG. 1 with certain portions thereof being shown in detailed form.
Figure 6:
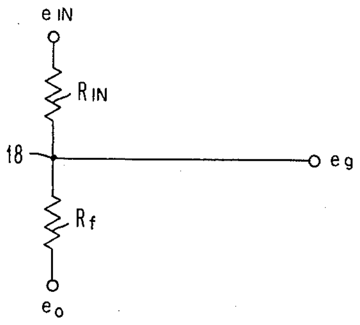
FIG. 6 is a section of the circuit of FIG. 2 removed therefrom to facilitate description of the action around one of the signal junctions.

Referring now to FIG. 2, there is indicated the circuit details for the amplifier arrangement indicated in block form in FIG. 1. The same reference characters on FIGS. 1 and 2 represent identical conductors and components while a more detailed circuit showing at particular points is explained hereinafter. A resistor $R_2$ is connected between the output of amplifier 11 and the conductor 13, while a capacitor $C_2$ is connected from the output of amplifier 11 to ground as indicated. The signal summing junction 18 of FIG. 1 is comprised of a resistor $R_{in}$ as indicated in FIG. 6. The two amplifiers 10 and 11 are still shown in block form in FIG. 2 and may be any suitable commercially available amplifiers, the operation and circuit details of which are known to those versed in the art. For example, the amplifier 11 may be the model 111–A amplifier obtainable from the Kintel Division of Cohue Electronics—S725 Kearney Villa, San Diego 12, California, this amplifier having a low bandpass and a high gain (1000). The amplifier 10 may be a model SKL 214B obtainable from Spencer-Kennedy Laboratories, Inc., 320 Soldiers Field Road, Boston 35, Massachusetts, this amplifier being a high bandpass amplifier. The amplifier 11 has an output impedance designated $R_3$ in the lower right hand corner while the amplifier 10 has an output impedance comprised of a resistor $R_1$ and a series output capacitance $C_1$ as also designated in the lower right hand corner thereof.

Representative values for some of the components of FIG. 2 are

| | | |
|---|---|---|
| $R_{in}$ | ohms | 100,000 |
| $R_2$ | do | 500 |
| $R_1$ | megohms | 2 |
| $C_2$ | microfarads | 1.6 |

The mathematical proof for the contention that the amplifier circuit arrangement as shown in FIG. 2 will give an overall system frequency versus gain characteristic that is flat (within $\mp 1\%$) from zero frequency up to where the response of amplifier 10 falls off, is given hereinafter.

Figure 5:
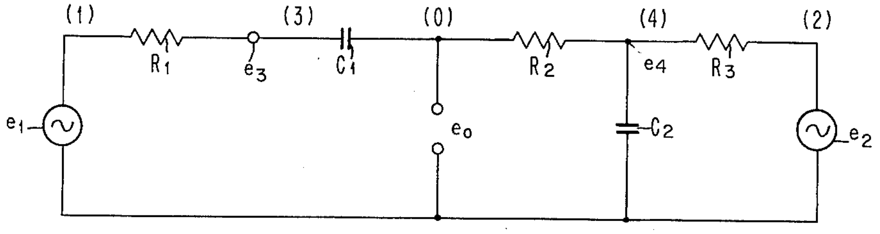
FIG. 5 is the equivalent circuit form of the circuit arrangement of FIG. 2.

Referring now to FIG. 5 there is shown the equivalent circuit for the circuit as shown in FIG. 2. The same reference indications in FIGS. 2 and 4 designate identical components. This circuit of FIG. 5 will be analyzed by conventional network analysis methods such as may be found for example starting at page 47 of the Standard Text "General Network Analysis" by Lepage and Seely—publishers, McGraw-Hill—New York 1952.

In the circuit of FIG. 5 the following is defined:

$e_1$ equals the output of the high pass amplifiers 10

$R_1$ equals the resistive component of the output impedance of the high pass amplifier 10

$C_1$ equals the capacitive component of the output impedance in series with the output of the amplifier 10

$e_2$ equals the output voltage from low pass amplifier 11

$C_2$ is to make the load impedance to the high pass amplifier independent of changes in impedance looking into the low pass amplifier $R_2$ is the load resistance for the high pass amplifier $R_3$ is the resistive component of the output impedance of the amplifier 11

$e_0$ is the output voltage

Five node points (0), (1), (2), (3) and (4) are also indicated in FIG. 5 and as a further definition.

$e_3$ is the voltage at node point (3) and $e_4$ is the voltage at node point (4) while $e_0$ (output voltage) is also the voltage at node point (0).

By definition the conductance in FIG. 5

$$g_1=\frac{1}{R_1}$$

$$g_2=\frac{1}{R_2}$$

$$g_3=\frac{1}{R_3}$$

Writing the nodal equations for 3 of the nodes, these equations describing the current flow out of the related node point where S is the complex frequency Laplace variable we have $$\text{Node }(0)=e_0(SC_1+g_2)-e_3SC_1-e_4g_2=0$$
$$\text{Node }(3)=-e_0SC_1+e_3(SC_1+g_1)=e_1g_1$$
$$\text{Node }(4)=-e_0g_2+e_4(g_2+g_3+SC_2)=e_2g_3$$

The solution of these set of simultaneous equations to obtain $e_0$ is effected by the use of determinants as follows We define:

$$\Delta=\begin{vmatrix} SC_1+g_2 & -SC_1 & -g_2 \\ -SC_1 & SC_1+g_1 & 0 \\ -g_2 & 0 & g_2+g_3+SC_2 \end{vmatrix}$$

Adding the second horizontal row to the first row, then adding the first column to the third column gives $$\Delta=\begin{vmatrix} g_2 & g_1 & 0 \\ -SC_1 & SC+g_1 & -SC_1 \\ -g_2 & 0 & g_3+SC_2 \end{vmatrix}$$

Therefore multiplying long diagonals gives $$\Delta=g_2(SC_1+g_1)(g_3+SC_2)+g_1g_2SC_1+g_1SC_1(g_3+SC_2)$$

or (Equation 15)

$$\Delta=S^2[C_1C_2(g_1+g_2]+S[g_2(g_3C_1+g_1C_2)+g_1C_1(g_2+g_3)]+g_1g_2g_3$$

The solution continues; we define $\Delta_1$ by:

$$\Delta_1=\begin{vmatrix} 0 & -SC_1 & -g_2 \\ e_1g_1 & SC_1+g_1 & 0 \\ e_2g_3 & 0 & g_2+g_3+SC_2 \end{vmatrix}$$

Therefore:

$$\Delta_1=e_2g_2g_3(SC_1+g_1)+e_1g_1SC_1(g_2+g_3+SC_2)$$

or (Equation 16)

$$\Delta_1=S^2[e_1g_1C_1C_2]+S[e_2g_2g_3C_1+e_1g_1C_1(g_2+g_3)]+e_2g_1g_2g_3$$

Solving for $e_0$: we have:

(Equation 17)

$$e_0=\frac{\Delta_1}{\Delta}=\frac{S^2[e_1g_1C_1C_2]+S\,[e_2g_2g_3C_1+e_1g_1C_1(g_2+g_3)]+e_2g_1g_2g_3}{S^2[(g_1+g_2)\,C_1C_2]+S\,[g_2(g_3C_1+g_1C_2)+g_1C_1(g_2+g_3)]+g_1g_2g_3}$$

Referring again to FIG. 2 it will be recalled that $e_1$ and $e_2$ may be rewritten as follows:

(Equation 18)

$$e_1=-G_1e_{in}$$

where $G_1$=gain of high freq. amplifier 10
$e_{in}$=input to high freq. amplifier
$e_1$=output of high freq. amplifier (Equation 19)

$$e_2=-G_2e_g$$

where $G_2$=gain of low freq. amplifier 11.

Referring now to FIG. 2, $e_g$ is developed as follows where:

$e_g$=input to the low freq. amplifier 11
$R_{in}$=input impedance of low freq. amplifier 11
$R_f$=feedback resistor The circuit around junction 18 in FIG. 2 is accordingly as indicated in FIG. 6.

From FIGURE 6 we may then state that $$e_g=(e_0-e_{in})\left(\frac{R_{in}}{R_{in}+R_f}\right)+e_{in}$$

Expanding:

$$e_g=e_0\frac{R_{in}}{R_{in}+R_f}-e_{in}\frac{R_{in}}{R_{in}+R_f}+e_{in}$$

If we define $$\frac{R_{in}}{R_{in}+R_f}=A$$

and $$1-A=B$$

The expression for $e_g$ becomes (Equation 20)

$$e_g=e_0A+e_{in}(1-A)$$
$$e_g=e_0A+e_{in}B$$

The numerical valves for A and B are obtained by substituting in the above expressions for A and B the given values of 100,000 ohms and 2 megohms respectively, for resistors $R_{in}$ and $R_f$. We thus obtain $$A=.04762$$

and $$B=.95238$$

The solution continues.

The gain of the particular model high pass high frequency amplifier 11 is by definition (Equation 21) $$G_2=-K_0\left(\frac{W_0}{S+W_0}\right)$$

where $K_0=10^3$ and $W_0=2\pi10^3$ (for Kintel model 111A gain of 1000).

Substituting expression for $e_g$ (Equation 20) and $G_2$ (Equation 21) into the equation for $e_2$ (Equation 19) we have (Equation 22) $$e_2=-G_2e_g=-\left[K_0\left(\frac{W_0}{S+W_0}\right)\right][e_0A+e_{in}B]$$

Substituting expressions for $e_1$ (Equation 18) and $e_2$ (Equation 22) into Equation 17 for $e_0$ we have (Equation 23)

$$e_0=\frac{S^2[G_1e_{in}g_1C_1C_2]+S[G_2e_gg_2g_3C_1+G_1e_{in}g_1C_1(g_2+g_3)]+G_2e_gg_1g_2g_3}{S^2[(g_1+g_2)C_1C_2]+S[g_2(g_3C_1+g_1C_2)+g_1C_1(g_2+g_3)]+g_1g_2g_3}$$

We now rewrite Equation 23 using a shortened notation for the coefficient of the terms:

(Equation 24)

$$e_0=\frac{aS^2+S(b+d+f)+(h+i)}{jS^2+Sk+l}$$

where replacing a, b, d, f, h, i, j, k and l, with their respective definitions as given below will again yield Equation 23.

The following values are known:

| | |
|---|---|
| $G_0=-20,000$ | $R_1=R_2=500\Omega$ |
| $g_1=g_2=2\times10^{-3}$ | $R_{in}$=100K |
| $g_3=1$ | $R_f$=2 meg. |
| $C_1=C_2$=1.6 ufd. | $A=.04762$ |
| $G_1=-40$ | $B=.95238$ |

We expand the coefficients of the terms of Equation 24:

$$a=-G_1e_{in}g_1C_1C_2=-(40)(2)10^{-3}(2.56)10^{-12}(e_{in})$$
$$a=-2.05\times10^{-13}(e_{in})$$

Redefining the constant or known portion of $a$ as $a'$, we may then state that (Equation 25)

$$a=a'e_{in}$$

We find coefficient $b+d+f$ of Equation 24 by substituting from Equations 20 and 21:

$$b+d+f=G_2e_gg_2g_3C_1+G_1e_{in}g_1C_1(g_2+g_3)=-K_0\left(\frac{W_0}{S+W_0}\right)(e_0A+e_{in}B)g_2g_3C_1+G_1e_{in}g_1C_1(g_2+g_3)$$

$$=\frac{-10^3(2\pi)10^3(.04762)(2)10^{-3}(1.6)10^{-6}e_0}{S+W_0}+\frac{-10^3(2\pi)10^3(.9523)(2)10^{-3}(1.6)10^{-6}e_{in}}{S+W_0}+-(40)(2)10^{-3}(1.6)10^{-6}(1+.002)e_{in}$$

$$b+d+f=\underset{(b)}{\frac{-9.569\times10^{-4}e_0}{S+W_0}}-\left[\underset{(d)}{\frac{19.13\times10^{-3}}{S+W_0}}+\underset{(f)}{1.28\times10^{-7}}\right]e_{in}$$

Redefining the constant known portion of $b$ as $b'$, $d$ as $d'$, and $f$ as $f'$ we may then state that (Equation 26) $$b+d+f=\underset{(b)}{\frac{b'e_0}{S+W_0}}+\underset{(d)}{\frac{d'e_{in}}{S+W_0}}+\underset{(f)}{f'e_{in}}$$

To find terms $h+i$ of Equation 24 we substitute from Equations 20 and 21

$$h+i=G_2e_gg_1g_2g_3=-K_0\left(\frac{W_0}{S+W_0}\right)(e_0A+e_{in}B)g_1g_2g_3$$

$$=-\frac{10^3(2\pi)10^3}{S+W_0}(.04762)(2)(2)10^{-6}(1)e_0-+\frac{10^3(2\pi)10^3}{S+W_0}(.9523)(2)(2)10^{-6}(1)e_{in}$$

$$h+i=-\left(\frac{\underset{(h)}{1.196e_0}+\underset{(i)}{23.91e_{in}}}{S+W_0}\right)$$

Redefining the constant or known portion of $h$ as $h'$, and $i$ as $i'$ we may then state that (Equation 27) $$h=i=\underset{(h)}{\frac{h'e_0}{S+W_0}}+\underset{(i)}{\frac{i'e_{in}}{S+W_0}}$$

To find term $j$ of Equation 24 by substitution of known values, we obtain $$j=(g_1+g_2)C_1C_2=(4)10^{-3}(1.6)(1.6)10^{-12}$$

(Equation 28)

$$j=10.24\times10^{-15}$$

To find term $k$ of Equation 24 by substitution, we obtain:

$$k=g_2(g_3C_1+g_1C_2)+g_1C_1(g_2+g_3)\text{ or, }A=(2)10^3(1.6)10^{-6}+(2)(1.6)(10^{-6})10^{-3}+(2)10^{-3}(1.6)10^{-6}(1.002)$$

$$=(2)10^{-3}[1.603(10^{-6})]+3.2\times10^{-9}$$

(Equation 29)

$$k=6.406\times10^{-9}$$

To find term $l$ of Equation 24 by substitution g known values we obtain:

$$l=g_1g_2g_3=(2)(2)(1)(10^{-3})(10^{-3})$$

(Equation 30)

$$l=4\times10^{-6}$$

By substituting the terms indicated in Equations 25, 26, 27, 28, 29 and 30 into Equation 24 we have:

$$e_0=\frac{a'e_{in}S^2+\left(\frac{b'e_0}{S+W_0}+\frac{d'e_{in}}{S+W_0}+f'e_{in}\right)S+\frac{h'e_0}{S+W_0}+\frac{i'e_{in}}{S+W_0}}{jS^2+Sk+l}$$

(Equation 31)

$$e_0=\frac{a'e_{in}S^2(S+W_0)+b'Se_0+d'e_{in}S+f'e_{in}S(S+W_0)+h'e_0+i'e_{in}}{(S+W_0)(jS^2+Sk+l)}$$

Since we are interested in obtaining the overall system gain where $$G=\frac{e_0}{e_{in}}$$

we divide Equation 31 by $e_{in}$ to obtain $$G=\frac{e_0}{e_{in}}=\frac{a'S^2(S+W_0)+b'S\frac{e_0}{e_{in}}+d's+f'S(S+W_0)+\frac{h\,e_0}{e_{in}}+i'}{(S+W_0)(jS^2+Sk+l)}$$

$$\frac{e_0}{e_{in}}(S+W_0)(jS^2+Sk+l)=a'S^2(S+W_0)+\frac{e_0}{e_{in}}(b'S+h')+d'S+f'S(S+W_0)+i$$

$$\frac{e_0}{e_{in}}=\frac{a'S^2(S+W_0)+d'S+f'S(S+W_0)+i'}{(S+W)(jS^2+Sk+l)-b'S-h'}$$

$$=\frac{a'S^3+a'W_0S^2+d'S+f'S^2+f'W_0S+i'}{jS^3+kS^2+lS+jW_0S^2+kW_0S+lW_0-b'S-h'}$$

$$=\frac{a'S^3+(a'W_0+f')S^2+(d'+f'W_0)S+i'}{jS^3+(jW_0+k)S^2+(l+kW_0-b')S+lW_0-h'}$$

Substituting known values of parameters $a'$, $b'$, $d'$, $f'$, $h'$, $i'$, $j$, $k+l$:

$$\frac{e_0}{e_{in}}=\frac{-2.05(10^{-13})S^3+2.05(10^{-14})(2\pi)10^3+1.28(10^{-7})S^2-19.13(10^{-3})+1.28(10^{-7})2\pi(10^3)S-23.91}{(10.24)10^{-15}S^3+10.24(10^{-15})2\pi(10^3)+6.406(10^{-9})S^2+4(10^{-6})+6.406(10^{-9})10^3+9.569(10^{-4})S+2\pi4(10^{-6})10^3+1.196}$$

(Equation 32)

$$G=-\frac{e_0}{e_{in}}=\frac{2.05(10^{-13})S^3+[12.87(10^{-11})+1.28(10^{-7})]S^2+[19.13(10^{-3})+8.03(10^{-4})]S+23.91}{10.24(10^{-15})S^3+[64.3(10^{-12})+6.406(10^{-9})]S+[4(10^{-6})+9.97(10^{-4})]S+1.22}$$

To find the gain for different frequencies S in Equation 32 is given the values of 0, $10^3$, $10^4$ and $10^5$ cps.

For $S=0$ $$G=-\frac{e_0}{e_{in}}=\frac{0+0+0+23.91}{0+0+0+\ 1.22}=19.925$$

Therefore:

$$\frac{G}{G_0}=\frac{19.925}{20}=\underline{\underline{.9962}}$$

For $S=10^3$ $$G=-\frac{e_0}{e_{in}}=\frac{2.05(10^{-4})+.128+19.13+.803+23.91}{10.24(10^{-6})+64.3(10^{-6})+6.406(10^{-3})+4(10^{-3})+.9971+1.22}=19.806$$

Therefore:

$$\frac{G}{G_0}=\underline{\underline{.9903}}$$

For $S=10^4$ $$G=-\frac{e_0}{e_{in}}=\frac{(2.05)(10^{-1})+12.87(10^{-3})+12.8+191.3+8.03+23.91}{10.24(10^{-3})+643(10^{-4})+.6406+.04+9.971+1.22}=19.88$$

Therefore:

$$\frac{G}{G_0}=\underline{\underline{.994}}$$

For $S=10^5$ $$G=-\frac{e_0}{e_{in}}=\frac{205+1.287+1280+1913+80.3+23.91}{10.24+.643+64.06+.4+99.71+1.22}$$

$$=\frac{3503.497}{176.273}=19.87$$

Therefore:

$$\frac{G}{G_0}=\underline{\underline{.9935}}$$

For $S=10^6$ $$G=-\frac{e_0}{e_{in}}=\frac{2.05(10^5)+1.28(10^5)+19.93(10^3)+23.91}{10.24(10^3)+6.47(10^3)+10.01\times10^2+1.22}$$

$$=19.992$$

Therefore:

$$\frac{G}{G_0}=0.999$$

Therefore it is shown that the gain is constant within 1% for a frequency range of 0 to beyond 150 kilocycles per second (observe that S has the dimensions of radians per second).

Referring again to FIGS. 1, 2 and 3, it will be recalled that the amplifier 11 around which the feedback loop extends has a high gain at zero frequency (FIG. 3) which then drops off with increasing frequency. It will be recalled that amplifier 10 has a gain characteristic that rises from zero at zero frequency to a point whereafter, the gain is substantially constant for an appreciable intermediate frequency, whereafter it drops off rapidly in a high frequency area. It will be noted in FIG. 3, the maximum gain of the amplifier 11 is substantially higher for most of its frequency range than the gain of amplifier 10. These amplifiers when combined in the circuit arrangement of FIG. 1 result in the overall gain characteristic as indicated in FIG. 4. It is not necessary that the individual amplifiers have curves as indicated in FIG. 3 in order to obtain a response as indicated in FIG. 4.

For example, referring to FIG. 7 there is shown the gain characteristic of two amplifiers which differ greatly from the characteristics of the amplifier represented in FIG. 3. Thus in FIG. 7, it will be noted that the amplifier with the characteristic $G_1$ has an appreciable gain at zero frequency the gain being relatively constant for a low frequency portion, whereafter it drops off rapidly in the mid-frequency area. The amplifier with the characteristic $G_2$ has zero gain at a low frequency point and then rises rapidly to a peak at a mid-frequency point, whereafter it declines to zero at a high frequency end. It will be noted that the maximum gain $G_2$ is substantially greater than the maximum gain $G_1$. The amplifiers whose gain characteristics are represented in FIG. 7 may be inserted into the circuit arrangement of FIG. 1 in place of the amplifiers whose characteristics are shown in FIG. 3, and the operation of the system will still be such so as to give an overall substantially flat system gain $G_0$ from zero frequency to the high frequency end as shown in FIG. 8. The only critical point to be considered is that the amplifier 11 in FIG. 1 must be the high gain amplifier of the two amplifiers 10 and 11. Thus with the amplifier as represented in FIG. 7, the one having the curve designated as $G_2$ is inserted as amplifier 11.

While the invention has been particularly shown and described with reference to a preferred embodiment thereof, it will be understood by those skilled in the art that various changes in form and details may be made therein without departing from the spirit and scope of the invention.

What is claimed is:

Apparatus for improving the gain versus frequency characteristic of a high bandpass amplifier to a desired gain versus frequency characteristic that is substantially constant through an extended frequency spectrum extending from zero frequency to a predetermined high frequency cutoff point of said extended spectrum, comprising a low bandpass amplifier having a gain $G_2$ versus frequency characteristic which is greater than said high bandpass amplifier gain $G_1$ versus frequency characteristic from zero frequency to a point in the mid-area of said extended spectrum at which point said low bandpass amplifier characteristic intersects said high bandpass amplifier characteristic and subsequently drops at zero, said highband amplifier gain $G_1$ at said intersection being equal to said desired constant gain, an individual input signal circuit for each said amplifier, an individual output signal circuit for each said amplifier, means for applying a common input signal to the input signal circuits of said first and second amplifiers, a first signal summing circuit linking the output circuits of said first and second amplifiers to provide a combined signal out, a second signal summing circuit interposed in the input signal circuit to said second amplifier, and a feedback loop feeding a signal representation of the output from said first summing circuit to said second summing circuit, said feedback being subtractive relative to the sense of said input signal, said feedback signal loop having a feedback function H equal to $1/G_1$.

References Cited in the file of this patent

UNITED STATES PATENTS

| | | |
|---|---|---|
| 2,748,201 | McMillan | May 29, 1956 |
| 2,781,423 | Kuczun et al. | Feb. 12, 1957 |